US012388220B2

(12) United States Patent
Matsumoto et al.

(10) Patent No.: US 12,388,220 B2
(45) Date of Patent: Aug. 12, 2025

(54) CONNECTOR

(71) Applicant: J.S.T. Mfg. Co., Ltd., Tokyo (JP)

(72) Inventors: Hiroyuki Matsumoto, Yokohama (JP); Shinya Masada, Yokohama (JP); Hayato Chiba, Yokohama (JP)

(73) Assignee: J.S.T. MFG. CO., LTD., Tokyo (JP)

( * ) Notice: Subject to any disclaimer, the term of this patent is extended or adjusted under 35 U.S.C. 154(b) by 329 days.

(21) Appl. No.: 18/133,939

(22) Filed: Apr. 12, 2023

(65) Prior Publication Data

US 2023/0335949 A1 Oct. 19, 2023

(30) Foreign Application Priority Data

Apr. 19, 2022 (JP) ................................ 2022-068594

(51) Int. Cl.
*H01R 13/639* (2006.01)

(52) U.S. Cl.
CPC .................................. *H01R 13/639* (2013.01)

(58) Field of Classification Search
CPC .............. H01R 13/639; H01R 13/6272; H01R 13/6273
See application file for complete search history.

(56) References Cited

U.S. PATENT DOCUMENTS 5,370,550 A * 12/1994 Alwine ................ H01R 13/641 439/352
6,824,417 B1 * 11/2004 Nimura ................ H01R 13/641 439/352
8,926,355 B2 * 1/2015 Heil .................. H01R 13/6275 439/352
11,456,553 B2 * 9/2022 Soh ........................ H01R 43/20
2017/0250492 A1 8/2017 Endo
2023/0335949 A1 * 10/2023 Matsumoto .......... H01R 13/639

FOREIGN PATENT DOCUMENTS

JP 6213590 B2 10/2017

* cited by examiner

*Primary Examiner* — Neil Abrams
(74) *Attorney, Agent, or Firm* — Kratz, Quintos & Hanson, LLP

(57) ABSTRACT

A connector includes: a connector body including a lever arm having a first lock portion locked to a to-be-locked member of a mating connector when the connector body is fitted to the mating connector; and a second lock portion provided on the connector body so as to be slidable in a width direction orthogonal to a fitting direction to the mating connector. When the connector body is fitted to the mating connector, the second lock portion is released from a locked state to the connector body, by the mating connector, is slid in the width direction to a position where the second lock portion interferes with the lever arm, and restricts a release operation of the first lock portion from the to-be-locked member.

6 Claims, 8 Drawing Sheets

FIG. 4A
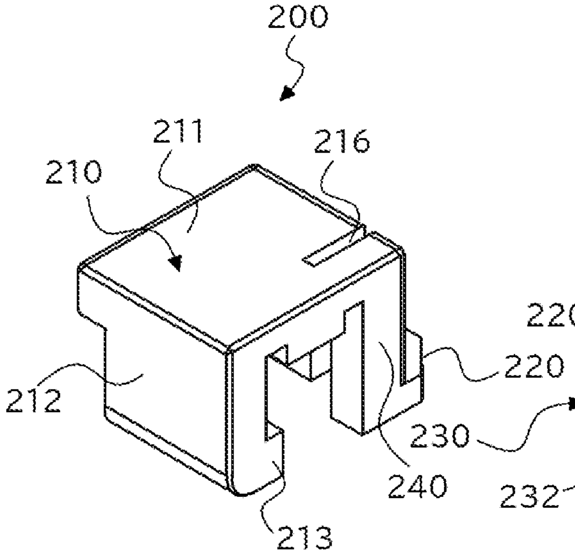
FIG. 4B
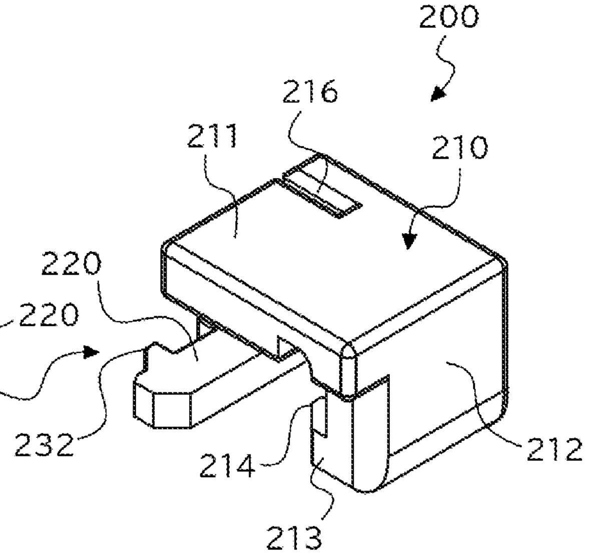
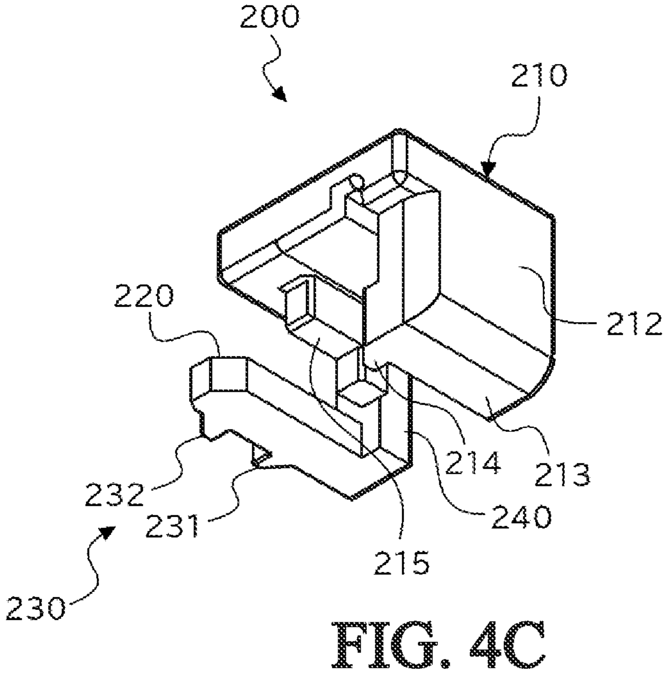
FIG. 4C

FIG. 6A
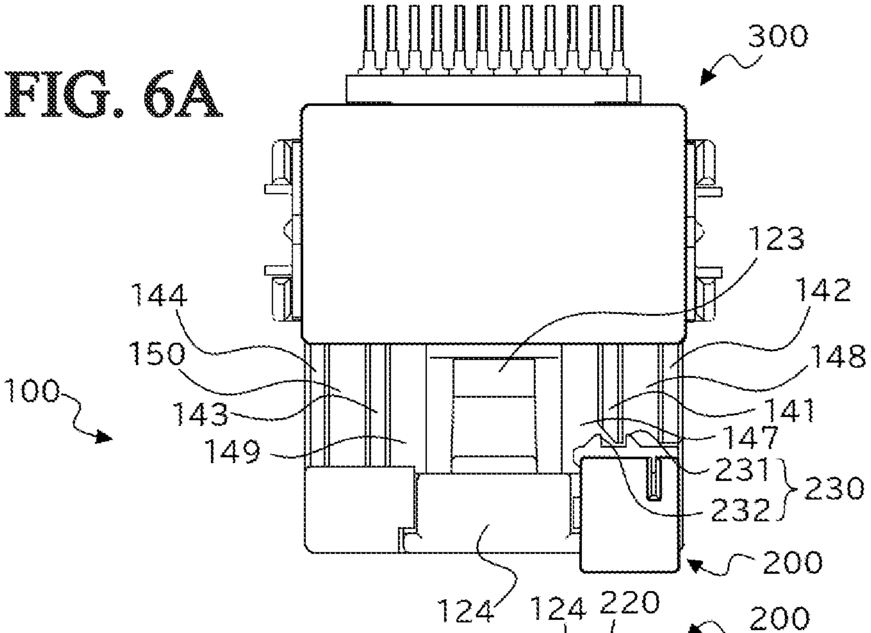
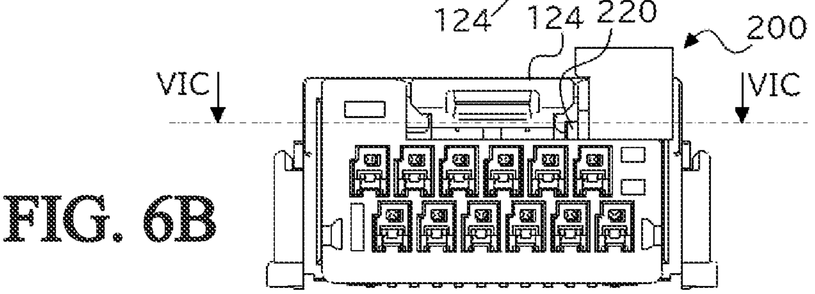
FIG. 6B
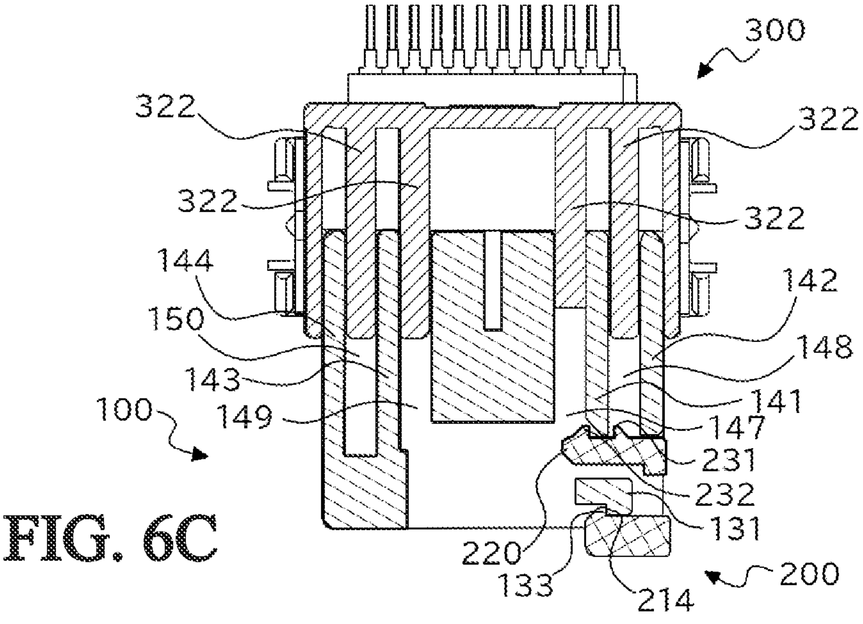
FIG. 6C

FIG. 7A
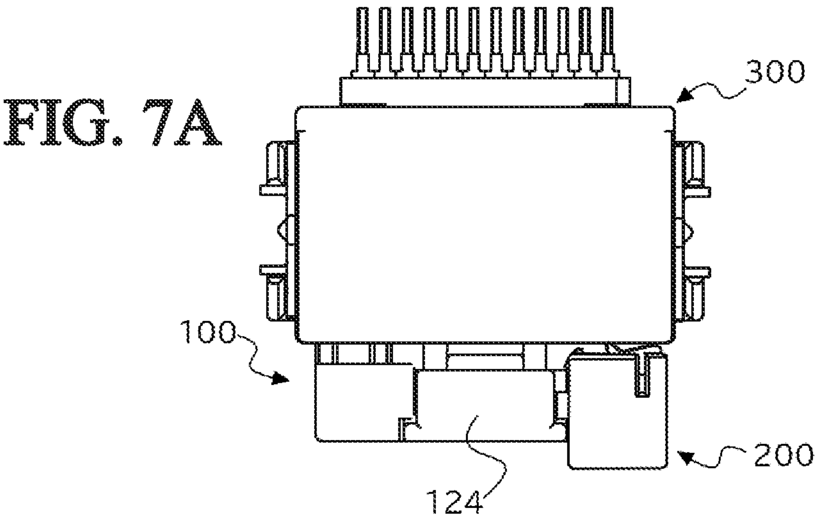
FIG. 7B
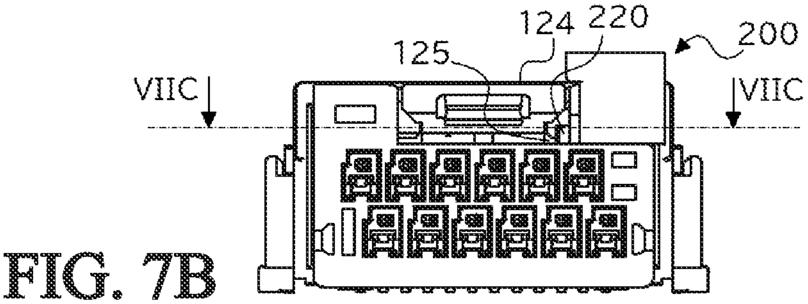
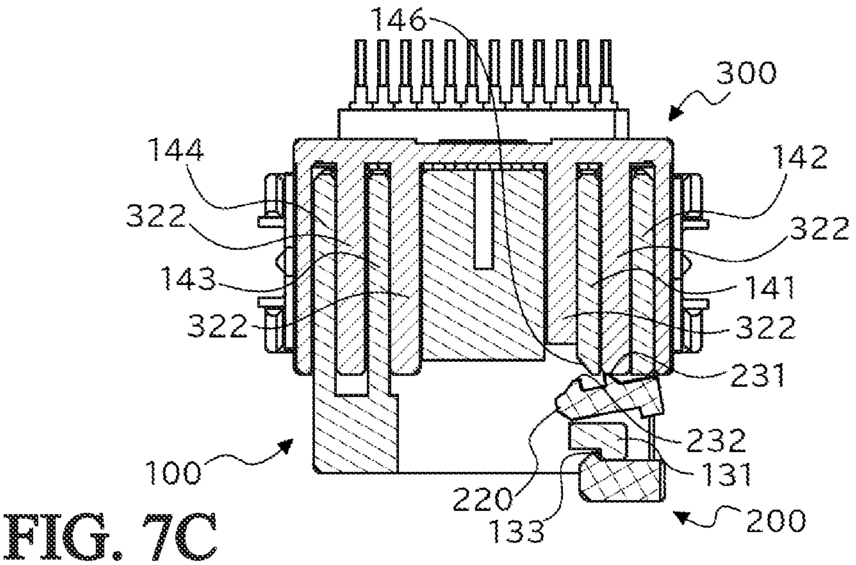
FIG. 7C

FIG. 8A
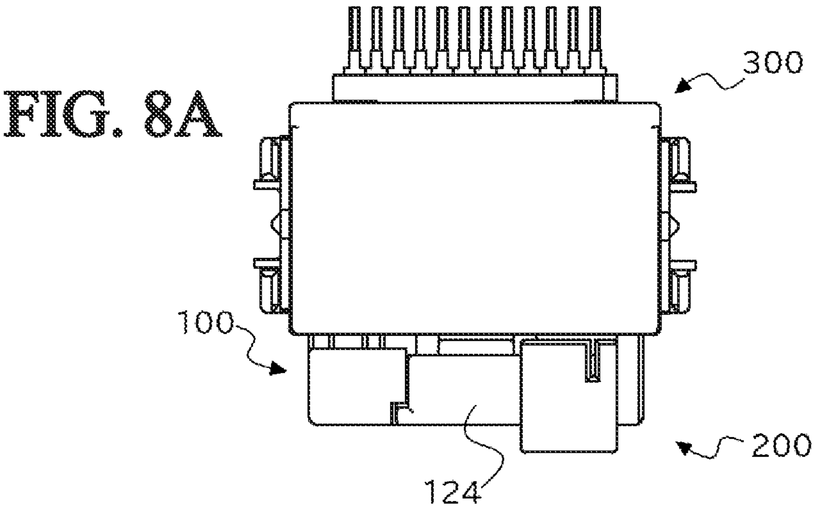
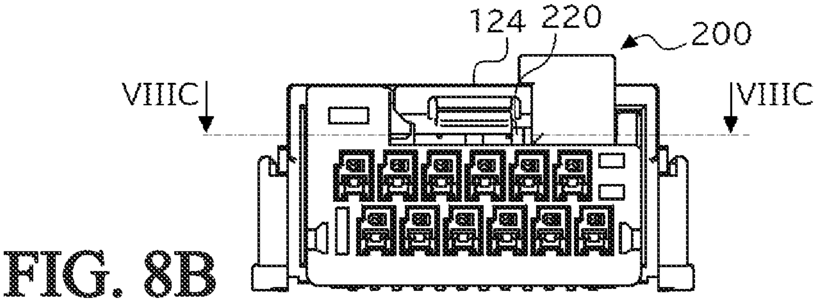
FIG. 8B
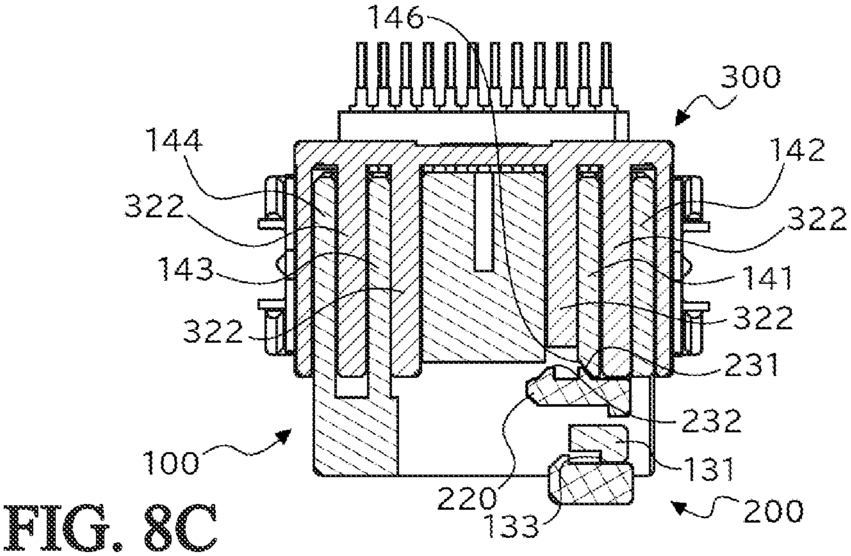
FIG. 8C

CONNECTOR

CROSS-REFERENCE TO RELATED APPLICATION

This application is based on and claims priority under 35 USC 119 from Japanese Patent Application No. 2022-068594 filed on Apr. 19, 2022, the disclosure of which is incorporated by reference herein.

BACKGROUND OF THE INVENTION

The present invention relates to a connector, in particular, a connector including a lock portion that integrally holds connectors after the connectors are fitted to each other.

RELATED ART

Conventionally, in order to maintain a fitted state of connectors, there is a connector of a type in which a connector position assurance (CPA) member is moved in a connector fitting direction to be assembled to a connector body and operated.

For example, JP 6213590 B2 discloses a connector in which a slide member is inserted into a slide channel formed between an inner housing and a lock arm extending in a connector fitting direction in parallel with the connector fitting direction. In the connector, the inner housing is fitted to an outer housing, and the lock arm is locked to the outer housing. Then, the slide member restricts the push-down operation of the locked lock arm so as not to release the lock.

SUMMARY

However, in the connector position assurance mechanism configured as disclosed in JP 6213590 B2, the slide member needs to be arranged below the lock arm even at a temporary locking position, and there is a problem that the height reduction cannot be realized.

Therefore, an object of the present invention is to provide a connector having a structure capable of reducing the extension height of the lever arm with respect to the connector body and achieving the height reduction of the connector.

In order to solve the above problem, a connector according to the present invention includes:

- a connector body including a lever arm having a first lock portion; and
- a second lock portion provided on the connector body, wherein
- the second lock portion is slidable in a width direction orthogonal to a fitting direction to a mating connector, the mating connector including a to-be-locked member, and
- when the connector body is fitted to the mating connector,
  - the first lock portion is locked to the to-be-locked member, and
  - the second lock portion is released from a locked state to the connector body, by the mating connector, and is slid in the width direction to a position where the second lock portion interferes with the lever arm, and is configured to restrict a release operation of the first lock portion from the to-be-locked member.

Furthermore, according to one aspect of the present invention, the lever arm extends in the fitting direction and has one side connected to the connector body and an other side forming an arm displacement space between the other side and the connector body, and the second lock portion is placed on the connector body and configured to take two positions of a temporary locking position and a main locking position in the width direction, at the temporary locking position, the second lock portion is located outside the arm displacement space in the width direction, and at the main locking position, is at least partially inserted into the arm displacement space to restrict a release operation of the lever arm.

Furthermore, according to one aspect of the present invention, the connector body includes: a guide member extending in the width direction and configured to guide the second lock portion to move in the width direction; and a locking member, the second lock portion includes: a straddling seat portion that straddles the guide member; a claw member that is locked to the locking member at the temporary locking position; an arm restricting member that is inserted into the arm displacement space at the main locking position; and a connecting portion that elastically deformably connects the straddling seat portion and the claw member, and when the connector body is fitted to the mating connector, the claw member is released from a locked state to the locking member by being pushed in the fitting direction by the mating connector.

Furthermore, according to one aspect of the present invention, the guide member and the straddling seat portion form a falling-off prevention structure that prevents the second lock portion from falling off from the guide member.

Furthermore, according to one aspect of the present invention, the locking member is formed on the connector body as a part of a rib that extends in the fitting direction and guides fitting of the mating connector, and the claw member is locked to the part of the rib at the temporary locking position.

According to the above aspect of the present invention, when the connector body and the mating connector are fitted, the second lock portion is configured to move from the temporary locking position where the second lock portion does not interfere with the lever arm to the main locking position where the second lock portion interferes with the lever arm. Accordingly, the extension height of the lever arm with respect to the connector body can be reduced, and the height reduction of the connector can be achieved.

According to the above aspect of the present invention, at the temporary locking position, the second lock portion is not inserted into the arm displacement space, so that the height of the arm displacement space can be reduced.

According to the above aspect of the present invention, it is possible to release the locking between the claw member and the locking member only when the connector body is fitted to the mating connector.

According to the above aspect of the present invention, it is possible to prevent the second lock portion from falling off from the connector body.

According to the above aspect of the present invention, it is not necessary to form the locking member that locks the second lock portion to the connector body and the rib that guides the fitting of the mating connector as separate members.

BRIEF DESCRIPTION OF DRAWINGS

FIG. 4A is a perspective view of a CPA member when viewed from a rear upper side, FIG. 4B is a perspective view of the CPA member when viewed from a rear upper side in a different direction from the case in FIG. 4A, and FIG. 4C is a perspective view of the CPA member when viewed from below;

FIG. 6A is a top view of the connector assembly when the CPA member is at a temporary locking position in a course of fitting the female connector to a male connector, FIG. 6B is a rear view of the connector assembly in FIG. 6A, and FIG. 6C is a cross-sectional view taken along line VIC-VIC in FIG. 6B;

FIG. 7A is a top view of the connector assembly when the CPA member is in a state where it transitions from the temporary locking position to a main locking position in a state where the female connector and the male connector are fitted, FIG. 7B is a rear view of the connector assembly in FIG. 7A, and FIG. 7C is a cross-sectional view taken along line VIIC-VIIC in FIG. 7B; and FIG. 8A is a top view of the connector assembly when the female connector and the male connector are completely fitted and the CPA member is at the main locking position, FIG. 8B is a rear view of the connector assembly in FIG. 8A, and FIG. 8C is a cross-sectional view taken along line VIIIC-VIIIC in FIG. 8B.

DETAILED DESCRIPTION OF THE INVENTION

A connector assembly 10 of the present embodiment will be described with reference to the drawings. Note that, in the embodiment described below, a female connector 100 of the connector assembly 10 is described as an example of the connector of the present invention, but the present invention is not limited to the female connector 100. The present invention should equally apply to other forms of connectors described in the claims.

Figure 1:
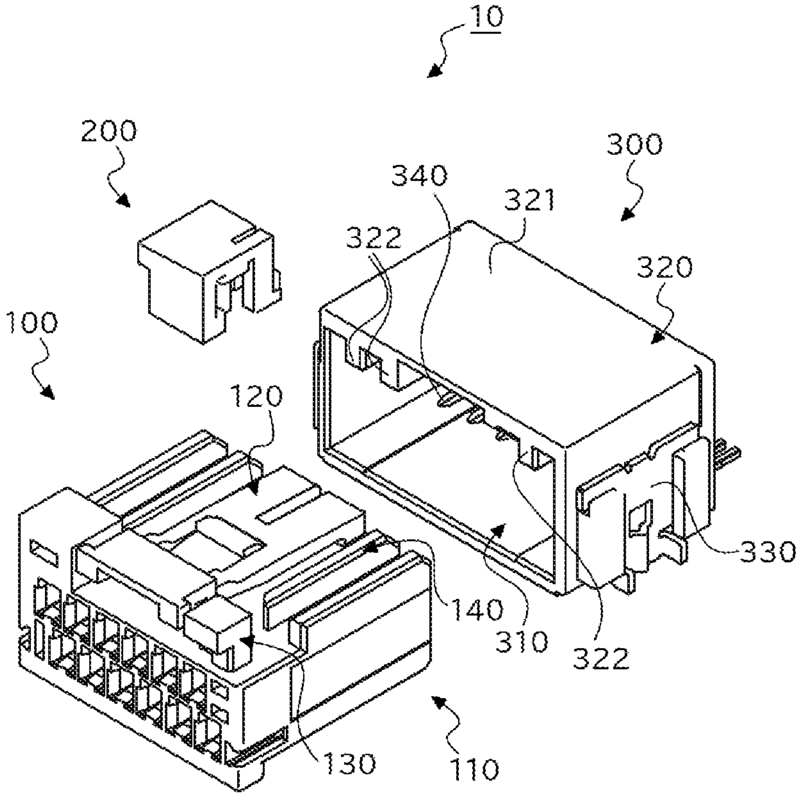
FIG. 1 is an exploded perspective view illustrating a configuration of a connector assembly according to an embodiment.

As illustrated in FIG. 1, the connector assembly 10 includes the female connector 100, a connector position assurance member 200 (hereinafter, referred to as a CPA member 200) as a second lock portion of the present invention, and a male connector 300 as a mating connector of the present invention. The female connector 100 is inserted into a fitting opening 310 of the male connector 300, and is fitted to the male connector 300. The CPA member 200 is provided on a connector body of the female connector 100 so as to be slidable in a width direction orthogonal to a fitting direction to the male connector 300, and locks the two connectors so as not to be detached when the female connector 100 is completely fitted to the male connector 300.

Note that, in the following description, a direction in which the female connector 100 moves when being fitted to the male connector 300 is referred to as the fitting direction, a direction orthogonal to the fitting direction and in which the CPA member 200 moves is referred to as the width direction, and a direction orthogonal to both the fitting direction and the width direction is referred to as a vertical direction. Furthermore, a side of the female connector 100 facing the male connector 300 in the fitting direction is referred to as "front", and a side opposite to the side is referred to as "rear".

Figure 2:
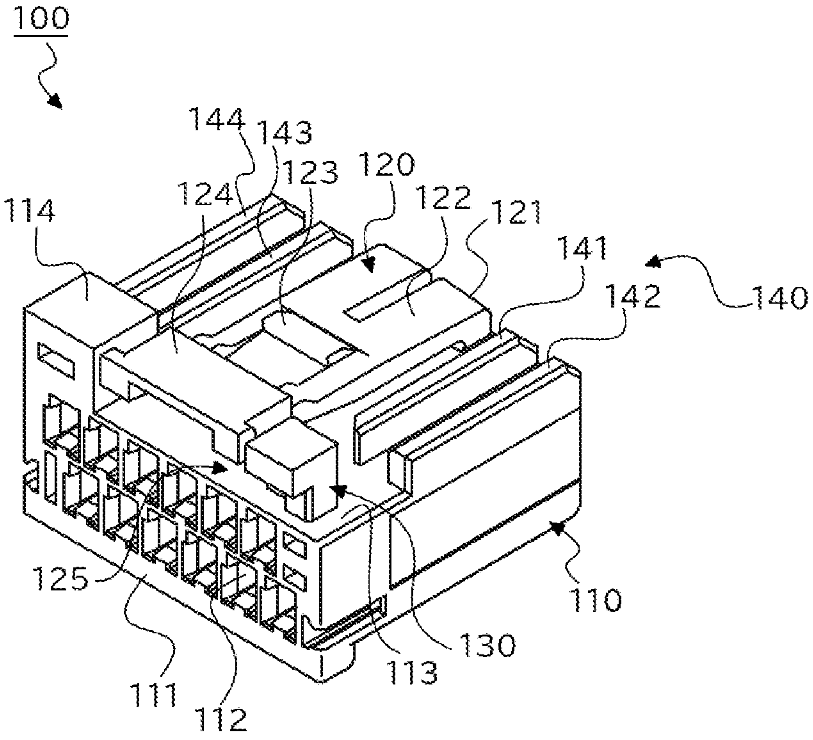
FIG. 2 is an external perspective view of a female connector according to the embodiment.

As illustrated in FIG. 2, the female connector 100 includes a connector body housing 110 having a substantially rectangular parallelepiped shape. The connector body housing 110 includes a lever arm 120, a guide member 130, and ribs 140. The connector body housing 110 is made of resin, and is formed by, for example, injection molding. The connector body housing 110 has a rear end surface 111 in which a plurality of terminal insertion ports 112 into which female terminals (not illustrated) are inserted are formed, and the female terminals are electrically connected to terminal accommodating chambers formed therein.

The lever arm 120 has a front end 121 side connected to a front end of an upper surface 113 of the connector body housing 110, and extends rearward substantially in parallel with the upper surface 113. The lever arm 120 has an upper surface 122 in which a lock protrusion 123 as a first lock portion is formed so as to protrude upward in a center portion in the fitting direction. The lock protrusion 123 is locked to a to-be-locked member (not illustrated) of the male connector 300 when the female connector 100 is fitted to the male connector 300.

The lever arm 120 has a rear end side on which a locking release button 124 is formed. An arm displacement space 125 is formed between the locking release button 124 and the upper surface 113 of the connector body housing 110, and the locking release button 124 is movable in the vertical direction. In a case where the female connector 100 is fitted to the male connector 300, a user pushes the locking release button 124 downward. As a result, the locked state of the lock protrusion 123 to the to-be-locked member of the male connector 300 is released, and a state is brought about in which the female connector 100 can be removed from the male connector 300 by moving the female connector 100 rearward in the fitting direction.

Figures 3A, 3B, 3C, 3D:
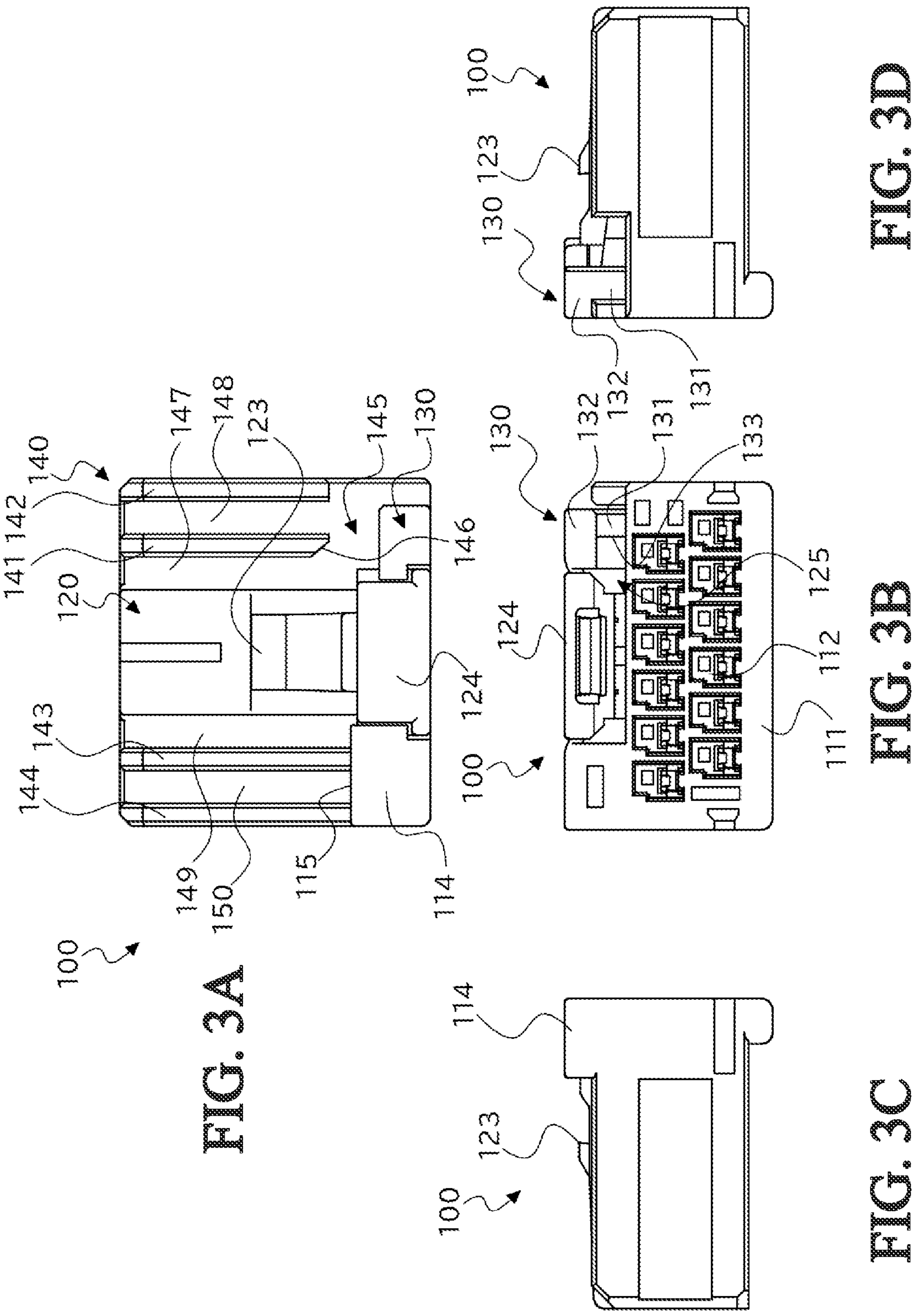
FIG. 3A is a top view of the female connector in FIG. 2.
FIG. 3B is a rear view of the female connector.
FIG. 3C is a right side view of the female connector.
FIG. 3D is a left side view of the female connector.
Figures 5A, 5B, 5C, 5D, 5E:
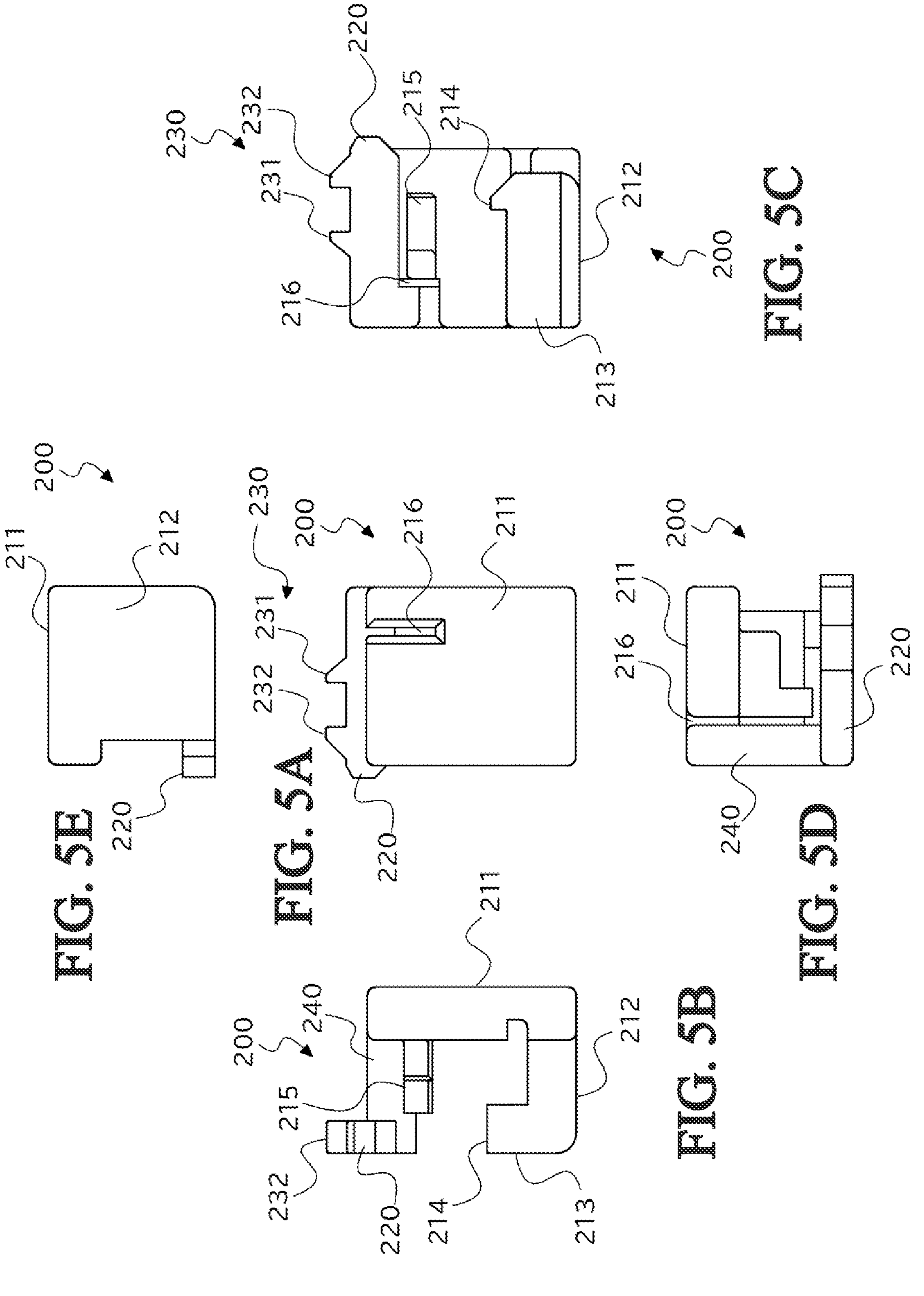
FIG. 5A is a top view of the CPA member in FIGS. 4A to 4C.
FIG. 5B is a right side view of the CPA member.
FIG. 5C is a bottom view of the CPA member.
FIG. 5D is a front view of the CPA member.
FIG. 5E is a rear view of the CPA member.

The guide member 130 is formed on the upper surface 113 of the connector body housing 110 on one outer side of the locking release button 124 in the width direction. The guide member 130 extends in the width direction, and guides the CPA member 200 to move in the width direction. As illustrated in FIG. 3D, the guide member 130 has an L shape in a side view and includes a guide base portion 131 protruding upward from the upper surface 113 of the connector body housing 110 and a head portion 132 protruding rearward from the guide base portion 131. Moreover, as illustrated in FIG. 6C, the guide base portion 131 has a shape in which a side far from the locking release button 124 has a large thickness in the fitting direction, and a side close to the locking release button 124 has a small thickness in the fitting direction, and a boundary portion therebetween is a guide shoulder portion 133.

As illustrated in FIG. 3A, a plurality of ribs 140 are formed on the upper surface 113 of the connector body housing 110 so as to extend in the fitting direction in parallel with each other on both sides of the lever arm 120 in the width direction. These ribs 140 are for guiding the fitting of the male connector 300. The rib 140 is a ridge member formed so as to protrude upward from the upper surface 113 along the fitting direction, and in the present embodiment, when viewed from the rear surface side, a first rib 141 and a second rib 142 are formed on the right side (the left side as viewed from the front) of the lever arm 120 and a third rib 143 and a fourth rib 144 are formed on the left side.

The first rib 141 and the second rib 142 are formed from the front end portion of the upper surface 113 of the connector body housing 110 rearward to a point in front of the guide member 130 and the locking release button 124 in a side view. In particular, the rear end portion of the first rib 141, which will be described later, functions as a locking member that holds the CPA member 200 at a temporary locking position. A CPA moving space 145 is formed between the first rib 141, the second rib 142, and the guide base portion 131 of the guide member 130. The CPA moving space 145 has a distance enough to allow an arm restricting member, which will be described later, of the CPA member 200 to be interposed, deformed, and moved. The rear end portion of the first rib 141 has an inclined surface 146 in which a side facing the lever arm 120 is obliquely chamfered forward from the rear end. Furthermore, a first guide slot 147 is formed between the first rib 141 and the lever arm 120, and a second guide slot 148 is formed between the first rib 141 and the second rib 142.

The third rib 143 and the fourth rib 144 are formed from the front end portion of the upper surface 113 of the connector body housing 110 rearward up to a block-shaped portion 114 formed at the rear end portion of the upper surface 113 of the connector body housing 110. A third guide slot 149 is formed between the third rib 143 and the lever arm 120, and a fourth guide slot 150 is formed between the third rib 143 and the fourth rib 144.

Next, the CPA member 200 will be described. As illustrated in FIGS. 4A to 4C and FIGS. 5A to 5E, the CPA member includes a straddling seat portion 210 straddling the guide member 130, the arm restricting member 220, claw members 230, and a connecting portion 240. The straddling seat portion 210 includes a top plate portion 211 spreading in the fitting direction and the width direction. A side plate portion 212 is provided substantially vertically downward from the rear end of the top plate portion 211. The side plate portion spreads in the vertical direction and the width direction. Moreover, the side plate portion 212 is provided with a flange portion 213 extending frontward in the fitting direction from the lower end in parallel with the top plate portion 211. One side end of the flange portion 213 in the width direction, that is, a side located on a lever arm 120 side when the CPA member 200 is attached to the guide member 130 is formed with a guide claw portion 214 protruding frontward in the fitting direction.

The lower surface of the top plate portion 211 is formed with an auxiliary guide protrusion 215 on the front side in the fitting direction so as to protrude substantially vertically downward in parallel with the side plate portion 212. Therefore, the guide member 130 is fitted into an L-shaped space surrounded by the top plate portion 211, the side plate portion 212, the flange portion 213, and the auxiliary guide protrusion 215. As described above, the straddling seat portion 210 is attached so as to straddle the guide member 130, and the CPA member 200 is movable in the width direction along the guide member 130. In addition, in the straddling seat portion 210 and the guide member 130, the flange portion 213 is prevented from moving upward by the head portion 132 of the guide member 130, and the guide claw portion 214 is locked to the guide shoulder portion. This forms a falling-off prevention structure that prevents falling in upward and outward in the width direction.

The top plate portion 211 is formed with a slot 216 that extends in the fitting direction. A portion outside the slot 216 in the width direction forms the connecting portion 240 vertically extending downward from the top plate portion 211. The connecting portion 240 is separated from other portions of the top plate portion 211 and the auxiliary guide protrusion 215, and can be displaced independently.

The connecting portion 240 has a lower end portion provided with the arm restricting member 220 extending in the width direction. The arm restricting member 220 protrudes from a side end portion of the top plate portion 211 in the width direction toward the center side in a top plan view. The arm restricting member 220 has a wall thickness that is about the same as or slightly smaller than the protruding height of the rib 140 of the connector body housing 110 from the upper surface 113 in the vertical direction. Furthermore, the claw members 230 that protrude frontward in the fitting direction and are locked to the first rib 141 when the CPA member 200 is at the temporary locking position are formed on a surface of the arm restricting member 220 on the front side in the fitting direction. The claw members 230 include a first claw member 231 provided on the outer side in the width direction and a second claw member 232 provided on the center side in the width direction. In other words, the connecting portion 240 elastically deformably connects the straddling seat portion 210 and the arm restricting member 220 on which the claw members 230 are formed.

Next, the male connector 300 as the mating connector will be described. As illustrated in FIG. 1, the male connector 300 is formed by injection molding using resin or the like and includes a substantially box-shaped male housing 320 having the fitting opening 310 formed on the rear side in the fitting direction. The male housing 320 has a side surface in the width direction attached with a mounting fixture 330 for mounting a printed circuit board (not illustrated). Furthermore, the male housing 320 has a front surface in the fitting direction to which a plurality of male terminals 340 formed of a conductive material are fixed so as to protrude into the fitting opening 310.

Moreover, the male housing 320 has an upper plate 321, a lower surface of which is formed with a plurality of rib guides 322 protruding downward along the fitting direction. These rib guides 322 slide by being fitted into the above-described first guide slot 147 to the fourth guide slot 150, and guide the insertion of the female connector 100 into the male housing 320.

Next, assembly and operation of the connector assembly 10 will be described. First, the CPA member 200 is placed on the connector body housing 110 of the female connector 100 so as to take two positions of the temporary locking position and a main locking position in the width direction. That is, the straddling seat portion 210 of the CPA member 200 is attached so as to straddle the guide member 130. As particularly illustrated in FIG. 6C, at the temporary locking position, the CPA member 200 is configured such that the guide claw portion 214 is locked to the guide shoulder portion 133 so that the CPA member 200 does not move outward in the width direction. Furthermore, the arm restricting member 220 is located in the CPA moving space 145, and the first claw member 231 enters the second guide slot 148 between the first rib 141 and the second rib 142 and is locked to the rear end portion of the first rib 141. As a result, the CPA member 200 takes the temporary locking position where the movement to the center side in the width direction is prevented. At the temporary locking position, the CPA member 200 is located outside the anti displacement space 125 in the width direction. That is, a distal end portion of the arm restricting member 220 on the center side in the width direction does not reach the arm displacement space 125 between the locking release button 124 and the upper surface 113 of the connector body housing 110, and the locking release button 124 is movable in the vertical direction.

Next, in a state where the CPA member 200 is attached, the connector body housing 110 of the female connector 100 is inserted into the fitting opening 310 of the male housing 320 of the male connector 300. At this time of operation, the rib guides 322 formed on the lower surface of the upper plate 321 of the male housing 320 slide by being fitted into the first guide slot 147 to the fourth guide slot 150, and guide the insertion of the connector body housing 110 of the female connector 100 into the male housing 320.

Next, as illustrated in FIGS. 7A to 7C, the female connector 100 is inserted into the male housing 320 of the male connector 300 toward the front side in the fitting direction to establish a fitted state. At this time of operation, the lock protrusion 123 of the lever arm 120 is locked to the to-be-locked member (not illustrated) formed on the lower surface of the upper plate 321 of the male connector 300. Furthermore, a state is brought about in which the female terminals (not illustrated) and the male terminals 340 are connected to each other and electrically conductive to each other.

Furthermore, at this time of operation, the CPA member 200 is mounted such that the straddling seat portion 210 straddles the guide member 130, and thus, cannot move frontward and rearward in the fitting direction. On the other hand, the connecting portion 240 and the arm restricting member 220 can be displaced with a connecting portion between the connecting portion 240 and the top plate portion 211 as a fulcrum by the slot 216. Accordingly, as particularly illustrated in FIG. 7C, a rear end of the rib guide 322 of the male connector 300 comes into contact with the first claw member 231, and the first claw member 231 is pushed rearward in the fitting direction. Then, the first claw member 231 moves rearward in the fitting direction of the second guide slot 148. As a result, the distal end portion of the arm restricting member 220 on the center side in the width direction is displaced rearward in the fitting direction, and the locked state of the first claw member 231 to the first rib 141 is released. At this time of operation, a state is brought about in which the CPA member 200 is movable toward the center side in the width direction. That is, the CPA member 200 is released from the locked state to the connector body housing 110 by the fitting of the male connector 300.

Next, as illustrated in FIGS. 8A to 8C, the CPA member 200 is slid toward the center side in the width direction to the main locking position where the CPA member 200 interferes with the locking release button 124 of the lever arm 120. That is, when the CPA member 200 is slid toward the center side in the width direction, the first claw member 231 gets over the first rib 141, displacement of the arm restricting member 220 returns to the original state, and the first claw member 231 enters the first guide slot 147. Then, the distal end portion of the arm restricting member 220 on the center side in the width direction reaches the arm displacement space 125 between the locking release button 124 and the upper surface 113 of the connector body housing 110, and a state is brought about in which the locking release button 124 cannot move downward. That is, in the CPA member 200 at the main locking position, the arm restricting member 220 is inserted into the arm displacement space 125. As a result, the lever arm 120 cannot move in the vertical direction inside the fitting opening 310 of the male housing 320, and the operation of releasing the lock protrusion 123 from the to-be-locked member formed on the lower surface of the upper plate 321 of the male connector 300 is restricted.

When releasing the fitting between the female connector 100 and the male connector 300, first, the CPA member 200 is moved outward in the width direction. As a result, the first claw member 231 of the CPA member 200 comes into contact with the inclined surface 146 of the first rib 141, so that the first claw member 231 is pushed rearward in the fitting direction, and a state is brought about in which the arm restricting member 220 is moved rearward in the fitting direction. Furthermore, at this time of operation, a state is brought about in which the distal end portion of the arm restricting member 220 on the center side in the width direction is retracted outward in the width direction from the arm displacement space 125 between the locking release button 124 and the upper surface 113 of the connector body housing 110, and a state is bought about in which the locking release button 124 is movable downward. As a result, the lever arm 120 can move downward inside the fitting opening 310 of the male housing 320, and the lock protrusion 123 can be released from the to-be-locked member formed on the lower surface of the upper plate 321 of the male connector 300. The first claw member 231 gets over the rear end of the first rib 141 and moves to the rear of the second guide slot 148, but the rib guide 322 is interposed in the second guide slot 148, so that a state is brought about in which the first claw member 231 is pushed rearward of the rib guide 322.

In this state, by pushing the locking release button 124 downward to release the lock protrusion 123 from the to-be-locked member of the male connector 300 and pulling out the female connector 100 from the fitting opening 310 of the male connector 300 rearward in the fitting direction, the female connector 100 can be removed from the male connector 300.

Furthermore, at this time of operation, displacement of the arm restricting member 220 to the rear side in the fitting direction returns to the original state, and the first claw member 231 enters the second guide slot 148 and is locked to the rear end portion of the first rib 141. Furthermore, the arm restricting member 220 is located in the CPA moving space 145. As a result, the CPA member 200 is brought into a temporarily locked state in which the movement to the center side in the width direction is prevented. Furthermore, the guide claw portion 214 is locked to the guide shoulder portion 133, so that the CPA member 200 is brought into a state in which the CPA member 200 does not move outward in the width direction.

The configuration and operation of the connector assembly 10 according to the present embodiment have been described heretofore. Note that, in the above embodiment, a case has been described where the rear end portion of the first rib 141 formed on the connector body housing 110 is used as the locking member, and the first claw member 231 of the CPA member 200 is locked thereto at the temporary locking position. However, the present invention is not limited thereto. The rear end portion of any one of the second rib 142 to the fourth rib 144 may be used as the locking member, and any one of the claw members formed in the CPA member 200 may be locked thereto.

Furthermore, in the above embodiment, a case has been described where the guide member 130 is arranged on the upper surface 113 of the connector body housing 110 on the right side as viewed from the rear (the left side as viewed from the front) in the fitting direction with respect to the lever arm 120, and the CPA member 200 is arranged thereon. However, the present invention is not limited thereto, and the guide member 130 and the CPA member 200 may be provided on the left side as viewed from the rear in the fitting direction. Furthermore, the lever arm 120, the guide member 130, and the CPA member 200 may be provided on the lower surface of the connector body housing 110.

Furthermore, in the above embodiment, a case has been described where two ribs are formed on each side of the lever arm 120 in the width direction, but the present invention is not limited thereto. It is sufficient that at least one rib is formed on a side where the CPA member 200 is arranged, and two, three, or more ribs may be formed. Furthermore, ribs, the numbers of which are different on the left and right in the width direction, may be formed. Furthermore, the intervals between the ribs may be different on the right and left. In this case, if rib guides, the number and width of which are corresponding to the ribs, are formed in the male connector 300, it is also possible to impart a misconnection identification function of identifying the connection of different types of connectors.

What is claimed is:

1. A connector comprising:

a connector body including a lever arm having a first lock portion; and a second lock portion provided on the connector body, wherein the second lock portion is slidable in a width direction orthogonal to a fitting direction to a mating connector, the mating connector including a to-be-locked member, and when the connector body is fitted to the mating connector, the first lock portion is locked to the to-be-locked member, and the second lock portion is released from a locked state to the connector body, by the mating connector, and is slid in the width direction to a position where the second lock portion interferes with the lever arm, and is configured to restrict a release operation of the first lock portion from the to-be-locked member.

2. The connector according to claim 1, wherein the lever arm extends in the fitting direction and has one side connected to the connector body and an other side forming an arm displacement space between the other side and the connector body, and the second lock portion is placed on the connector body and configured to take two positions of a temporary locking position and a main locking position in the width direction, at the temporary locking position, the second lock portion is located outside the arm displacement space in the width direction, and at the main locking position, is at least partially inserted into the arm displacement space to restrict a release operation of the lever arm.

3. The connector according to claim 2, wherein the connector body includes: a guide member extending in the width direction and configured to guide the second lock portion to move in the width direction; and a locking member, the second lock portion includes: a straddling seat portion that straddles the guide member; a claw member that is locked to the locking member at the temporary locking position; an arm restricting member that is inserted into the arm displacement space at the main locking position; and a connecting portion that elastically deformably connects the straddling seat portion and the claw member, and when the connector body is fitted to the mating connector, the claw member is released from a locked state to the locking member by being pushed in the fitting direction by the mating connector.

4. The connector according to claim 3, wherein the guide member and the straddling seat portion form a falling-off prevention structure that prevents the second lock portion from falling off from the guide member.

5. The connector according to claim 3, wherein the locking member is formed on the connector body as a part of a rib that extends in the fitting direction and guides fitting of the mating connector, and the claw member is locked to the part of the rib at the temporary locking position.

6. The connector according to claim 4, wherein the locking member is formed on the connector body as a part of a rib that extends in the fitting direction and guides fitting of the mating connector, and the claw member is locked to the part of the rib at the temporary locking position.

* * * * *